Patented Jan. 16, 1940

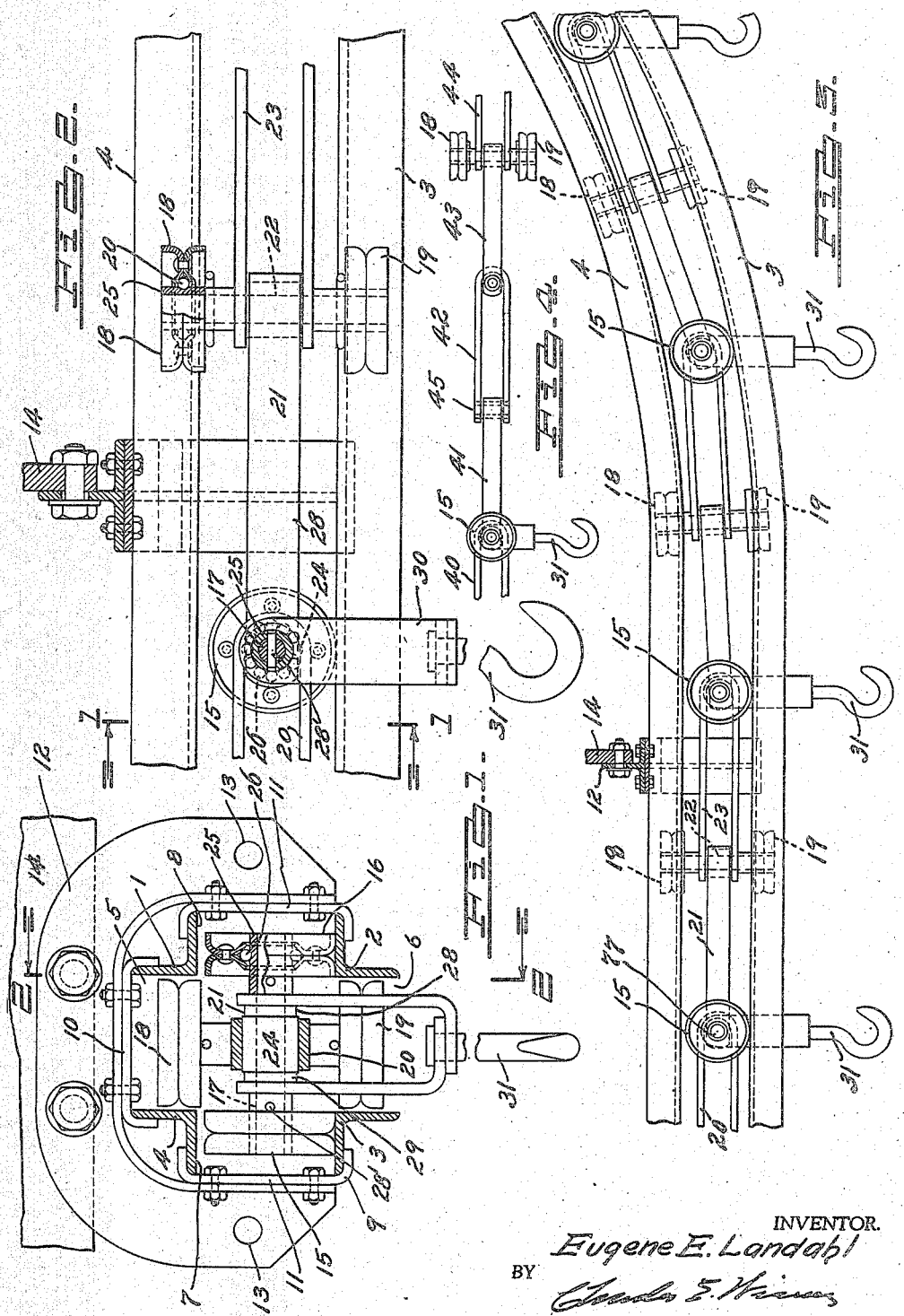

2,187,498

UNITED STATES PATENT OFFICE 2,187,498

TROLLEY CONVEYER

Eugene E. Landahl, Detroit, Mich.

Application April 30, 1938, Serial No. 205,263

4 Claims. (Cl. 198—177)

This invention relates to trolley conveyers of the type in which a trolley wheel traverses a track which may be curved in either vertical or horizontal planes and in which the trolley elements are connected by links of a chain and useable in carrying articles in a manufacturing plant, for instance, from one position to another.

A feature of the invention is involved in the arrangement of hangers and trolley wheels wherein the links of the chain as well as the hangers are pivoted to the axles of the trolley wheels.

In many previous structures, the chain is connected with the hangers rather than with the axles of the trolley wheels under which construction excessive strains are imposed upon the chain in traversing the curve of the track due to its being a greater radial distance from the center of the curve than the trolley and, if the curve is in a vertical plane, does not permit the articles carried to remain suspended in a vertical plane passing through the axis of the axle.

A further object and feature of the invention is to provide a trolley conveyer having a track formed with two ways at a right angle one to the other, each track being traversed by trolleys in planes at a right angle one to the other and thereby sustaining the chain member connecting the trolleys in traversing a curve in a horizontal or vertical plane as is hereinafter described.

It is further a feature and object of the invention to provide a trackway formed of four angle irons secured together to form two raceways, one occupying a horizontal plane and the other a substantially vertical plane for traversing by successive trolleys respectively rotatable on a vertical and a horizontal axis and to the axles of which the links of the chain are pivoted and a hanger pivotally supported on the axis of the trolleys rotatable on a horizontal axis.

A further feature and object of the invention is to provide links of comparatively inexpensive construction formed of bar iron bent upon itself to U form and each of the trolleys having the axle passing through the eyes of one link and the bend of the next connecting link.

These and other objects and various novel features of the invention are hereinafter more fully described and claimed, and the preferred form of construction of a trolley conveyer embodying my invention is shown in the accompanying drawing in which—

Fig. 1 is an elevation partly in section taken on line 1—1 of Fig. 2 showing my improved trolley construction.

Fig. 2 is a section taken on line 2—2 of Fig. 1.

Fig. 3 is an elevation of a trolley and the trackway showing the relationship of the trolleys having the horizontal and vertical axes and one arrangement of connecting link of the chain.

Fig. 4 is an elevation showing an alternative form of chain wherein the trolleys are spaced more than one link apart.

Trolley conveyers of the general character herein described are utilized in carrying articles about a plant, for instance, or wherever articles require to be conveyed from one place to another, as from one building to another, or to a yard and as heretofore made, a trackway is provided on which the trolley wheels are all mounted for rotation on axles occupying the same general plane.

By my improved construction, I provide a track which has two ways for trolley wheels and this is shown in cross section in Fig. 1 as a structure consisting of four angle irons 1, 2, 3 and 4 arranged in upper and lower pairs and providing upper and lower flanges on opposite sides of the center of the pair at a right angle to the other flanges. The two pairs of angle irons thus provide a trackway indicated generally at 5 and 6 occupying a vertical plane and a trackway indicated generally at 7 and 8 occupying a horizontal plane. The angle irons 1, 2, 3, 4 are secured together in the relation stated as by means of bars 9, 10 and 11 welded or otherwise secured to the flanges of the angle irons as shown at successive intervals along the trackway and to which is secured a supporting bracket 12 of T form. This bracket 12 may be of any desired form adapted to rigidly secure the trackway in place in a building, the member here shown being formed with apertures 13 for bolting to a convenient building structure as, for instance, the beam 14 shown in Fig. 3.

With a trackway of this form, I provide a pair of trolley wheels 15 and 16 carried on a horizontal axle 17 which ride the trackways provided by the horizontal flanges of the angle irons 2 and 3. The diameter of the trolley wheels is less than the distance apart of the horizontal flanges of the angle irons. I also provide a pair of trolley wheels 18 and 19 arranged for rotation on a vertical axle which may ride the vertical flanges of the angle iron elements 1, 2, 3 and 4 particularly when that portion of the trackway is formed on a curve in a horizontal plane and the trolley wheels 18 and 19 serve to take the side strain of the chain connecting the trolley wheels as hereinafter described.

It will be observed from the description so far given that, if the curve of the track is in a horizontal plane, the trolley wheels 15 and 16 are held from material lateral movement on the trackway formed by the horizontal flanges of the angle iron 2 and 3 by reason of contact of the trolley wheels 18 and 19 with the vertical flanges of the trackway, it being understood that the trolleys are connected together by links of a chain in pivotal relation with the axles of the respective pairs.

In traversing a trackway having a curve in a vertical plane as shown in Fig. 3, the wheels 15 and 16 having the horizontal axis are held from material vertical displacement by the upper horizontal flanges of the track and the trolleys, as they begin to traverse the curve, move from contact with the flanges of the lower angle irons to contact with the horizontal flanges of the upper angle irons. Due to the chain of links being in pivotal relation with the trolley axles in the alternate relation shown, the track may be arranged in either a vertical or horizontal curve or even in a spiral without imposing any great strain on the chain and trolley due to the character of the pivoting of the successive trolleys in respect to the chain.

With the chain pivoted to the axles of the successive trolleys, I avoid the difficulties theretofore encountered in connecting the chain to the hangers as heretofore, particularly the difficulty involved in the turning about a curve in a vertical plane such as shown in Fig. 3 in which the chain would tend to swing the hangers from parallel vertical position secured by my construction or tend to bind due to the chain turning on an arc of a greater radius than the radius traversed by the trolleys.

As previously stated, the invention is not confined to the use of the oppositely arranged trolleys connected in successive links as several links may be pivoted together between successive trolley elements and various other changes in the structure or arrangement of the parts may be made without departing from the spirit and scope of the invention as set forth in the appended claims.

Preferably the chain is formed of links constructed from flat bar stock bent to U form as indicated at 20 in Fig. 2 and that a succeeding link 21 of the same U form lies with the bar at a right angle to those of the link 20 and has apertures aligned with the axis of the bend of the link 20 to receive the axle 17 of the trolleys 15 and 16. The U bend of the link 20 has its axis in a horizontal plane and the shaft 22 lies in the bend of the link 21 and extends through the eyes of the next link 23 of the series. The trolley wheels 18 and 19 are carried by the shaft 22 which, in making a horizontal curve, engage the vertical faces of the pair of angle irons 3—4 or 1—2, depending upon the direction of the curve. In many cases, especially where curves of the track are formed on a long radius, there may be several links between the oppositely disposed trolley elements as shown in Fig. 4 which as shown in Fig. 2, are arranged in successive links of the chain. In order to provide a proper bearing for the axle in the links, I provide a preferably hard metal sleeve 24 shown clearly in Fig. 1 and in dotted lines in Fig. 2 and the shaft may also be of hard metal providing wearing surfaces of long life. There is also a sleeve 25 on the shaft on which the trolleys are rotatably mounted as by the anti-friction bearings 26, which sleeve may be secured in place as by a pin 28' shown more particularly in Fig. 2.

It will be observed from Figs. 1 and 2 that there are two sleeves 25 pinned to opposite ends of the shaft 17 and there is also a separate sleeve 24 centrally positioned on the shaft and the arms 28 and 29 on the U link 30 are positioned on the shaft between the respective sleeves 25 and the sleeve 24. The outer end of each of the sleeves is formed to provide a raceway for the ball bearing 26 of the trolley wheels. The links are preferably made of a flat bar of uniform width bent to U form with parallel legs as will be understood from Fig. 2 and the shaft with its sleeve 24 lies in the bend of one link and extends through the eyes of the next succeeding link as will be understood from Figs. 2 and 4.

In Fig. 4 is shown a chain composed of links 40, 41, 42, 43 and 44. The axle of the trolley wheels 15 extends through the bend of the link 40 and through the eyes of the link 41 while in the bend of the link 41, there is a sleeve on a pin 45 which extends through the bend of the link 41 and the eyes in the arms of the link 42. There is a similar arrangement connecting the links 42 and 43 which latter link is in pivotal relation with the wheels 18 and 19 and the axle to which axle is connected the arms of the link 44. Thus the two trolleys may be spaced a greater or less distance apart as the character of installation may require. In fact, the trolleys may be spaced a dozen links apart but it is desirable that all the links of the chain shall be in the pivotal relation described and shown in Fig. 4 and also that the links engaging the trolley axles shall be in pivotal relation therewith substantially as shown.

From the foregoing description, it is believed evident that the various features and objects of the invention are attained by the construction described, and that various changes may be made in the structure and relationship of the parts without departing from the spirit and scope of the invention as set forth in the appended claims.

Having thus fully described my invention, its utility and mode of operation, what I claim and desire to secure by Letters Patent of the United States is:

1. In a conveyer of the class described, the combination with a series of trolley wheels, having axles, hangers depending from the said axles of certain of said wheels, successive alternate trolley wheels being arranged for rotation on axes respectively occupying planes at a right angle one to the other, a trackway formed of four angle iron members each having right angle faces and disposed with the meeting points thereof at the respective corners of a rectangle providing ways at a right angle one to the other for the trolley wheels in the respective planes, and a chain member including links pivotally connected to the axles of the trolleys.

2. In a conveyer of the class described, the combination with a series of trolley wheels arranged in pairs, axles for each pair of wheels, the axles for the successive wheels being arranged at a right angle one to the other, a chain having links, the ends of which are respectively in pivotal relation with successive axles, and a trackway formed of four angle iron members each having faces at a right angle one to the other and positioned with the meeting points of said faces at opposite points of a rectangle and providing ways in a plane at a right angle one to the other on which the respective pairs of trolley wheels may ride.

3. In a conveyer of the class described, the combination with a series of trolley wheels having axles, the axles of some of the wheels being at a right angle to the axles of the remainder, hangers pivoted to the axles of one of the said groups of the trolley wheels, a track comprising four angle irons having flat side faces, the meeting point of said faces of each angle iron being respectively positioned on the corners of a square, a bracket means connecting both the flanges of the angle irons forming one way and the flanges of the angle irons at one end of the other way, the opposite flanges of said other way being unconnected, and a hanger pivotally supported on the axle of the pair of wheels riding the first said way and extending between the unsupported flanges of the said other way a chain having links connecting the axles of both said groups of wheels, the trailing end of one link and the leading end of another link being pivotally connected with each axle of the two series.

4. In a conveyer of the class described, a trackway comprising four angle iron members having flat faces, means for supporting the said angle iron members in a group with the meeting point of the faces of each of the angle irons respectively positioned at the corners of a rectangle, the angle irons being spaced apart and providing ways, the opposed faces of one way being positioned at a right angle to opposed faces of the other, and trolleys for riding the respective ways, each trolley comprising a pair of wheels and an axles therebetween, the wheels of one trolley being positioned to ride between the opposed faces of one way and the wheels of an adjacent trolley positioned to ride between opposed faces of the other way with the axis of the respective trolley wheels at a right angle one to the other, and a link pivotally connected at its respective opposite ends to the axles of the successive pairs of wheels.

EUGENE E. LANDAHL.